United States Patent [19]
McCloskey

[11] Patent Number: 6,126,371
[45] Date of Patent: Oct. 3, 2000

[54] SHAPE MEMORY METAL ALLOY PRELOAD ATTENUATION DEVICE

[75] Inventor: Thomas Edward McCloskey, San Jose, Calif.

[73] Assignee: Lockheed Martin Corporation, Bethesda, Md.

[21] Appl. No.: 09/286,535

[22] Filed: Apr. 5, 1999

[51] Int. Cl.[7] .................................................. F16B 39/02
[52] U.S. Cl. .......................... 411/82.5; 411/909; 411/544
[58] Field of Search .................................. 411/82.5, 909, 411/535–537, 544, 149, 150, 368, 531

[56] References Cited

U.S. PATENT DOCUMENTS

| 4,450,616 | 5/1984 | Morita | 29/446 |
|---|---|---|---|
| 4,501,058 | 2/1985 | Schultzler | 29/446 |
| 4,571,133 | 2/1986 | Lindow | 411/150 X |
| 4,619,568 | 10/1986 | Carstensen | 411/909 X |
| 4,897,006 | 1/1990 | Blin | 411/368 |
| 5,010,949 | 4/1991 | Dehaine | 165/76 |
| 5,094,551 | 3/1992 | Katsuji | 384/518 |
| 5,160,233 | 11/1992 | McKinnis | 411/909 X |
| 5,180,268 | 1/1993 | Richardson | 411/149 X |
| 5,248,233 | 9/1993 | Webster | 411/333 |
| 5,316,319 | 5/1994 | Suggs | 411/544 X |
| 5,366,331 | 11/1994 | Erbes | 411/909 X |
| 5,545,230 | 8/1996 | Kinsinger et al. | 411/537 X |
| 5,581,441 | 12/1996 | Porter | 411/909 X |
| 5,667,347 | 9/1997 | Matthews | 411/150 |
| 5,709,514 | 1/1998 | Suggs et al. | 411/150 |
| 5,772,378 | 6/1998 | Keto-Tokoi | 411/909 X |
| 5,791,847 | 8/1998 | Keto-Tokpi | 411/368 |
| 5,827,025 | 10/1998 | Henriksen | 411/544 X |
| 5,829,253 | 11/1998 | Long | 60/528 |
| 5,938,386 | 8/1999 | Remerowski et al. | 411/909 X |

Primary Examiner—Suzanne Dino Barrett
Attorney, Agent, or Firm—Louis L. Dachs

[57] ABSTRACT

The device includes an inverted first cup shaped member having a center portion with an aperture therethrough and further having a side wall. A second cup shaped member includes a center portion with and aperture therethrough and a side wall in slidable engagement with the inner wall of the side wall of the first cup forming a compartment therebetween. An is mounted within the compartment which is made of a shape memory alloy having first and second sides at least partially engaged with the center portions of the first and second cups, respectively; and also having an aperture therethrough aligned with the apertures in the center portions of the first and second cups. At least one heating element is mounted about the insert and a flexible compound encapsulates the at least one heating element. The insert can be made from the memory alloy where a deformation undergone in the martensitic state is definitively cancelled out during the passage to the austenitic state. The insert can also be made of a trained two-way memory alloy where a deformation undergone in the martensitic state is cancelled out during the passage into the austenitic state, but is reassumed during a subsequent passage to the martensitic state. The insert can also be made from a trained two-way memory alloy where additional deformation undergone using a bias force during the austenitic to martensitic state is cancelled out during the passage into the austenitic state, but is reassumed during a subsequent passage to the martensitic state minus the additional induced deformation.

15 Claims, 3 Drawing Sheets

SHAPE MEMORY METAL ALLOY PRELOAD ATTENUATION DEVICE

BACKGROUND OF THE INVENTION

1. Field of the Invention

The invention relates to the field of fastening systems and, in particular, to preload attenuation devices that either reduce a preload on a assembled joint or applies a preload between joined structures and upon command, reduces the preload.

2. Description of Related Art

On satellites launched from ground based boosters, it is necessary to insure that the satellite and it's components will survive the large vibration and acoustic G forces produced during the first few minutes of flight. This requires that the satellite and its components be attached with highly pre-loaded fasteners. Unfortunately, this configuration can cause problems. Upon reaching orbit the satellite must be separated from it's booster. In addition, components of the satellite, such booms and antennas must thereafter be released. The separation of the booster rocket and deployment of the components commonly accomplished by the use of explosively actuated release systems. While these explosive devices are highly reliable, they can cause significant shock loads to be introduced throughout the satellite. Thus what is necessary is a fastening system that can produce a high preload and then, upon command or passively relax the preloads prior to actuation of these shock-inducing systems.

Shape Memory Alloys (SMA) offers a solution to this problem. There are numerous alloys having shape memory characteristics such as Ti-Ni, Au-Cd, In-Zn, Ti-Ni-Cu, Cu-Zn-Al and Cu-al-Ni and many are commercially available. There are basically two types of SMA actuation modes or memory configurations.

1. The One Way Shape Memory effect is defined as: Setting a desired shape through a heat treat process then mechanically deforming the SMA element to another specified configuration, while maintained in a cold or martensitic finished condition and not exceeding certain mechanically induced strain constraints. When the SMA element is then heated to and through its phase transformation temperature, austenitic start through finish, it will then return to its previous memory shape that was set during the heat treatment process. When cooled to it's martensitic temperature the SMA element will not change to any other intermediate shape and will remain in the original heat-treated configuration.

2. The Two Way Shape Memory effect is defined as: Setting an intermediate shape configuration through a heat treat process then mechanically deforming and repetitively training the SMA element to another specified configuration and by doing so, establishing a desired cold memory martensitic finished shape memory with a much different austenitic finish hot memory shape. With this two way memory established, the SMA element will then be able to transition from one memory shape to the other by transitioning from martensitic through austenitic with no requirement for an external mechanical strain to make a shape change. Upon cooling from austenitic too martensitic the process can then be reversed and the SMA element reverts back to it's cold martensitic shape configuration.

3. With this two way memory established, there is an added benefit to use the two-way memory effect while employing a Stress Induced martensite phenomena. This process will gives SMA element a greater displacement travel or shape change recovery capability through the martensitic to the austenitic shape change. This process would be classified as a cocking procedure, where as an additional bias strain is induced in the direction of the hot to cold shape change during the austenitic to martensitic cycle. This added travel or work will not repeat in subsequent two way memory cycles unless the added bias strain is employed again at the time of cooling.

There have been numerous fastener designs using shape memory alloys. For example, U.S. Pat. No. 4,450,616 "Method Of Ensuring The Tightness Of a Bolt And A Nut" by K. Morita discloses a method of preloading a joint using a simple washer made of shape memory metal. The washer is formed in the austenitic phase using a press. It is then cooled to a temperature lower than the temperature for starting an austenitic transformation. Thereafter the washer is installed and allowed to return to the higher temperature causing it to recover and expand preloading the joint. However, this washer is not suitable for applications where it is desirable to have the preload reduced after a specific amount of time. A similar washer is disclosed in U.S. Pat. No. 5,791,847 "Washer And Method Of Using The Washer" by J. M. Keto-Tokoi U.S. Pat. No. 4,897,006 "Device for exerting A Pressure Developing Stages On A Part" by M. Blin proposes that washers with varying critical transformation temperatures be stacked together to provide different preloads depending upon the temperature. The primary use of this invention contemplated by the inventor is in the fabrication of composite structures where the stack of washers can be used to control the pressure load on a part being formed within the mold. U.S. Pat. No. 5,094,551 "Preload Control Apparatus For Bearings With Shape Memory Alloy Springs" by K. K. Katsuji, et al. also discloses the use of springs of vary transformation temperatures to vary the preload on a bearing as a function of the bearing temperature.

U.S. Pat. No. 5,248,233 "No-Shock Separation Device" by R. G. Webster is more to the point of this invention in that is discloses a fastener assembly for relieving preloads. In detail, the patent to R. G. Webster discloses a fastener assembly that includes a segmented nut kept in engagement with the threads of a bolt by a spring-biased ring thereabout. A shape memory metal column (washer) is positioned under the nut that includes heating elements used to heat the column to above its transition temperature, such that it contracts and reduces the preload on the bolt. The contraction also releases the retainer allowing the segmented bolt to separate from the nut releasing the bolt. This fastener has a disadvantage in that the bolt is freed as the preload is reduced. There are numerous applications where it is desired to only reduce the preload, but still maintain the joint. In addition, there are applications where it is desirable to only maintain the preload for a short period and therefore reducing the preload without the application of electrical current. Finally, the separation point can not be precisely timed because of the variables in heating rates produced by the heating elements.

Thus, it is a primary object of the invention to provide a washer for preloading structures and for attenuating the preload.

It is another primary object of the invention to provide a washer for preloading structures and for attenuating the preload that is simple to manufacture.

It is a further object of the invention to provide a washer for preloading structures and for attenuating the preload that includes redundant heating elements to affect the change in preload.

It is a further object of the invention to provide a washer for preloading structures and for attenuating the preload that includes the use of stress induced martensite for cocking or reset so as to generate a greater recovery displacement or travel upon heating.

SUMMARY OF THE INVENTION

The invention is a preload attenuation device. In detail, the invention includes an inverted first cup shaped member having a center portion with an aperture therethrough and further having a side wall. A second cup shaped member includes a center portion with an aperture therethrough and a side wall in slidable engagement with the inner wall of the side wall of the first cup forming a compartment therebetween. An insert is mounted within the compartment which is made of a shape memory alloy having first and second sides at least partially engaged with the center portions of the first and second cups, respectively; and also having an aperture therethrough aligned with the apertures in the center portions of the first and second cups. The insert is preferably in the form of a belleville washer wherein the inner surface of one-side contacts one of the center portions and the other edge of the opposite side contacts the other one of the center portions. The insert can also have a cylindrical shape.

At least one heating element is mounted about the insert and a flexible compound, such as a silicone rubber, encapsulates the at least one heating element. When the insert is a belleville washer there is a heating element on either side of the washer and when the insert has a cylindrical shape there is only one heating element, positioned thereabout. The insert can be made from the simple memory alloy where a deformation mechanically undergone in the martensitic state is definitively cancelled out during the passage to the austenitic state. The shape memory alloy insert can also be made with a reversible trained two-way memory where a deformation undergone in the martensitic state is cancelled out during the passage into the austenitic state, but is reassumed during a subsequent passage to the martensitic state. In the former case, the insert is mechanically formed over sized in the martensitic state at low temperature. Thereafter it is installed and preloaded as the joint is mechanically fastened. When heated, it returns to its original austenitic size and causes the preload to be attenuated. In the latter case, the deformation is preformed in the austenitic state at temperature. Upon return to martensitic room temperature, it resumes its un-deformed state. When installed in a joint, it can be heated to cause the insert to expand increasing the preload. However, once the heat is removed it again returns to its un-deformed state, reducing the preload.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

DESCRIPTION OF THE PREFERRED EMBODIMENT

Figure 1:
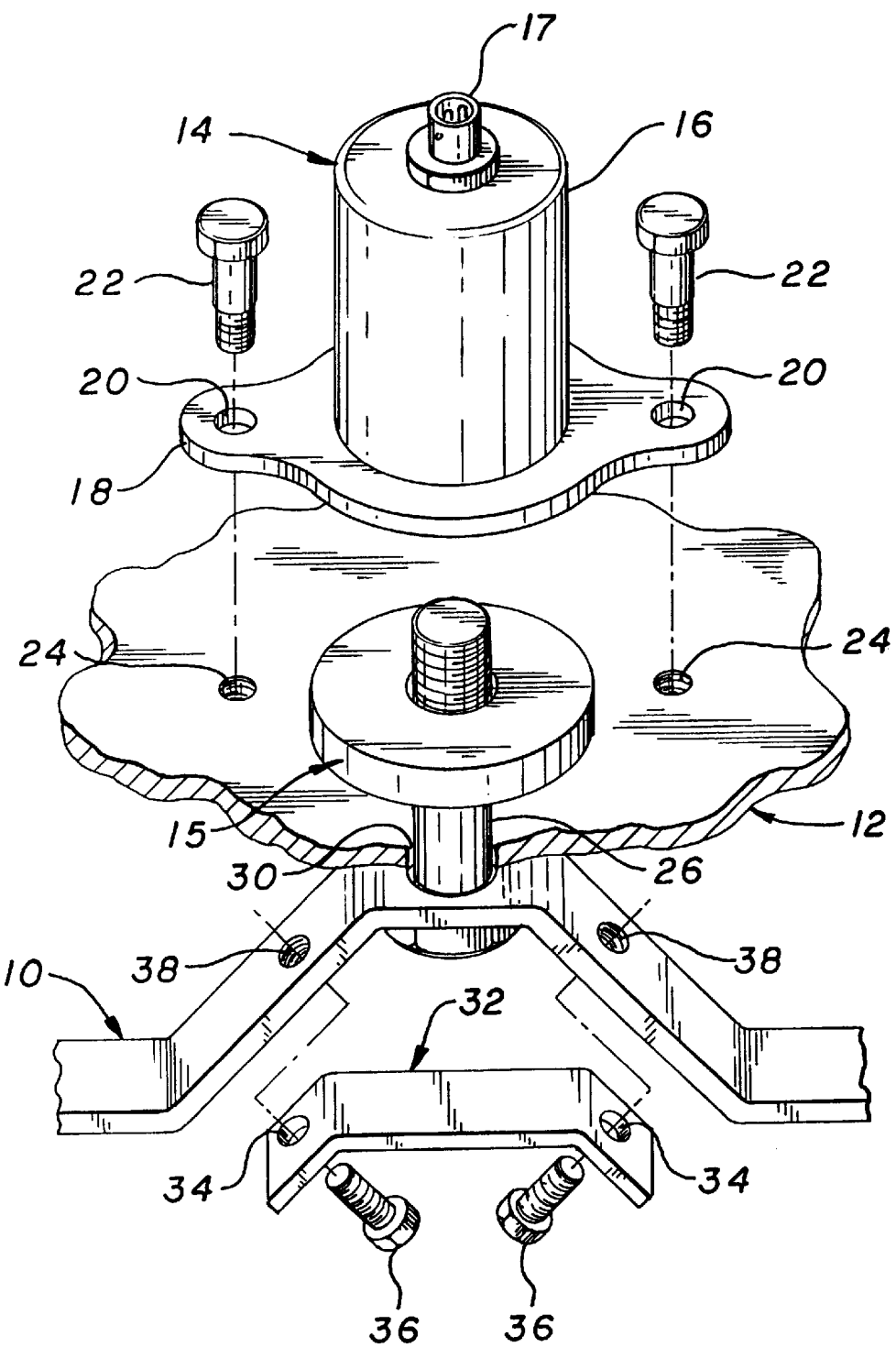
FIG. 1 is partial exploded perspective view of an attachment joint between a satellite structure and a launch booster structure wherein an explosive fastener assembly is used to join the two structures together and with the subject preload attenuation device incorporated into the joint.
Figure 2:
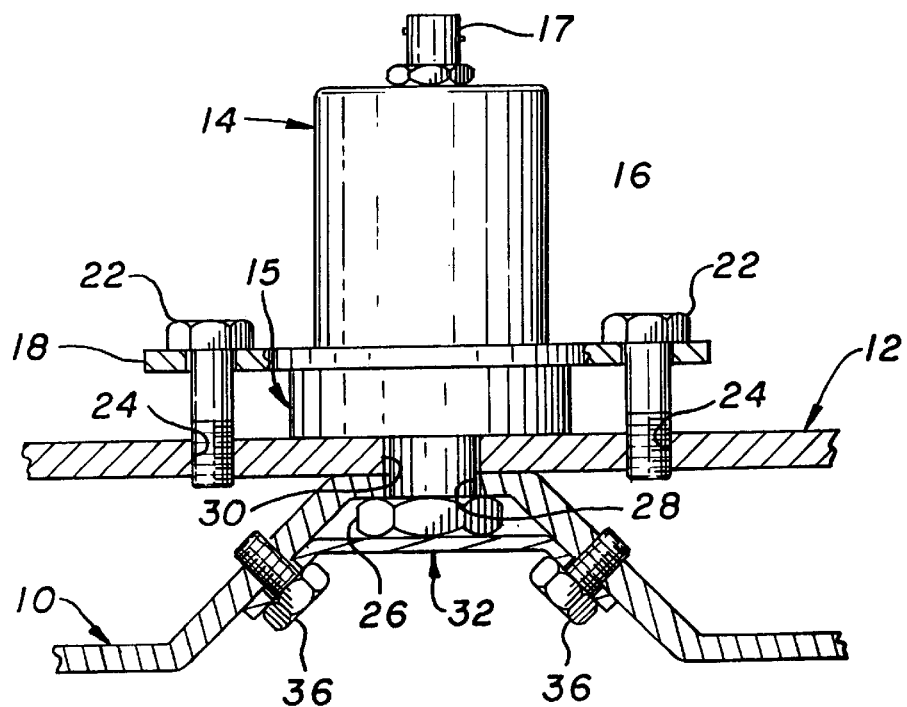
FIG. 2 is a side view of the assembled attachment joint illustrated in FIG. 1.

Illustrated in FIGS. 1 and 2 is a portion of a satellite structure 10 attached to a portion of a satellite booster structure 12 by means of an explosive fastener assembly 14 incorporating the subject preload attenuation device, indicated by 15. The use of explosive actuated fastener assemblies is preferred because they are highly reliable and light in weight. It is necessary to secure the satellite structure 10 to the booster structure 12 with very high preloaded fasteners in order to insure that the high vibration loads from the booster generated during the first few minutes of launch do not cause damage to the satellite. However, after the satellite reaches orbit and is in position for release from the booster 12, the preload must be reduced in order to attenuate the shock loads caused by activation of the explosive actuated fastener 14. Thus it is necessary to incorporate the preload attenuation device 15.

The explosively actuated fastener assemblies are old in the art and need not be discussed in much detail. However, the explosively actuated fastener 14 includes a container 16 in which is contained an segmented actuation nut (not shown) and includes an explosive initiator (not shown) with electrical connector 17 for coupling to a source of electrical power (not shown). The container 16 is mounted to a flange 18 having fastener holes 20 therein. Screws 22 extend through the holes 20 and engage threaded holes 24 in the booster structure 12. The subject device 15 is mounted between the container 16 and the structure 12. An attachment bolt 26 extends through hole 28 and 30 in the 10 and booster structures 12, and connects to the nut (not shown) in the container 16. A bolt retainer 32 includes holes 34, through which screws 36 extend and engage threaded holes 38 in the structure 10, thus securing the bolt 26 after separation from the nut within the container 16. Upon the application of an electrical signal through the electrical connector 17, the explosive is-ignited causing the nut to release from the bolt 26. This of course allows the structure 10 to separate from the structure 12. It should be understood that other types of explosively actuated fasteners could be used, for example, explosively actuated pin pullers. Additionally, more than one explosively actuated fastener assembly 14 is required to secure the satellite structure 10, but they are typically all identical in their functionality.

Figure 3A:
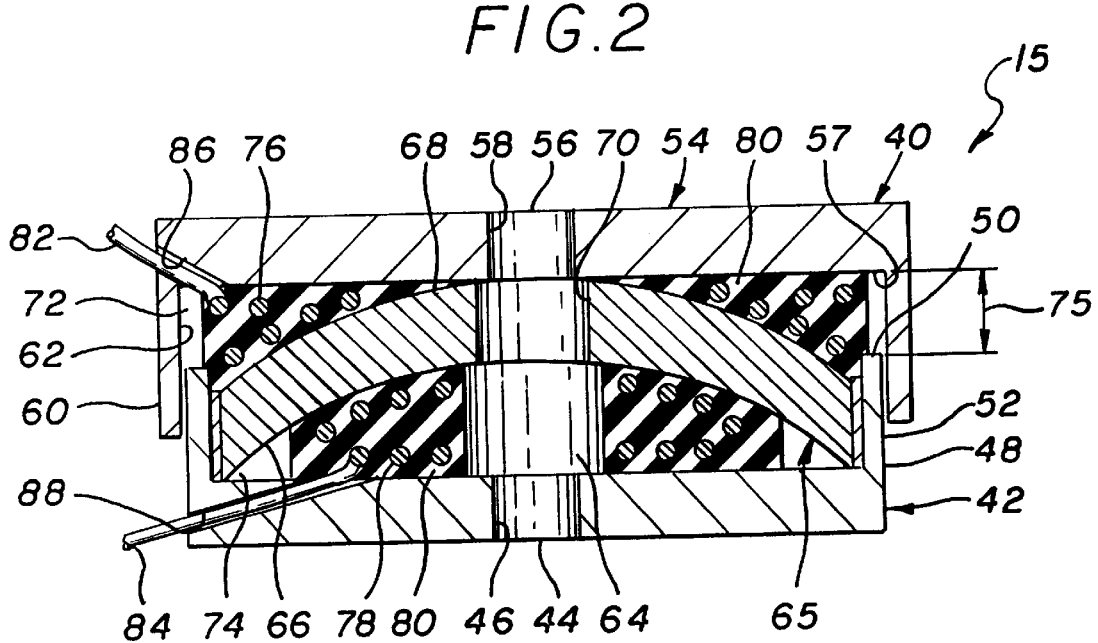
FIG. 3A is cross-sectional view of the preload attenuation device in the expanded preload position illustrated in FIGS. 1 and 2 wherein the insert is a belleville washer made of a shape memory alloy.
Figure 3B:
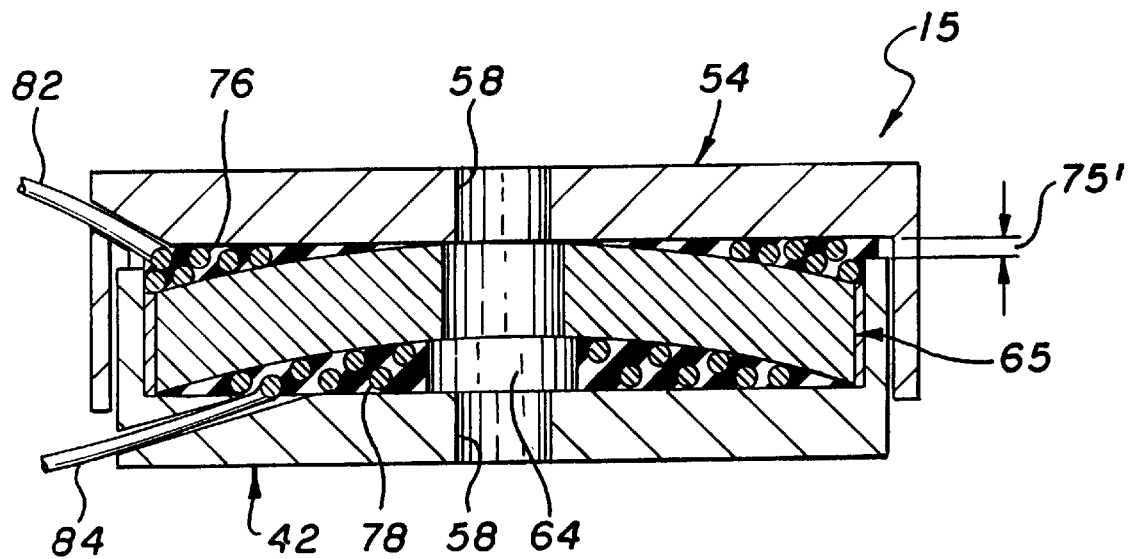
FIG. 3B is a view similar to FIG. 3A illustrating the preload and preload attenuation device in the attenuation position.

Referring to FIGS. 3A and 3B the device 15 includes a generally circular shaped housing assembly 40; however other shapes are usable. The housing assembly 40 includes a first cup shaped member 42 having a flat center section 44 with an aperture 46 therethrough and a side wall 48 with an upper edge 50 and outer surface 52. The device 15 further includes an inverted cup shaped member 54 having a center section 56 with underside surface 57 and an aperture 58 therethrough. The member 54 further includes a side wall 60 having an inner surface 62 in slidable contact with the outer surface 52 of the side wall 48 of the member 42 forming a chamber 64. A belleville washer 65 is mounted within the chamber 64 having a portion of a first surface 66 in contact with the center portion 44 of the member 42 and a portion of a second surface 68 in contact with the center portion 56 of the member 54. The belleville washer 65 includes an aperture 70 therethrough. The belleville washer 65 is made of:

Type 1. A simple memory alloy where a deformation undergone in the martensitic state is definitively cancelled out during the passage to the austenitic state; or Type 2. A reversible memory alloy where a shape memory deformation undergone in the martensitic state is cancelled out during the passage into the Austenitic state, but is reassumed during a subsequent passage to the martensitic state; or Type 3. A type 2 reversible memory alloy employing a stress induced martensite phenomena.

It can be seen that the chamber 64 is divided into two portions 72 and 74 with each having a heating element 76 and 78, respectively, therein, both encapsulated in a flexible material such as Silicon compound 80, which is also in contact with the belleville washer 65. The Silicon compound improves the heat transfer to the belleville washer 65. Electrical wire leads 82 and 84 connect the heating elements 76 and 78 to a source of electrical power (not shown) through exit holes 86 and 88 in the cup 56 and 42, respectively. The Silicon compound can be a one part or a two-part catalyst type. It can also be thermally conductive with a metallic or metallic oxide filler for greater heat conductance. Such Silicon compounds are commercially available from Nusil Technology, Carpinteria, California (Product No. CV-2942) or General Electric Co. Waterford, New York (Product No. RTV 556)

Referring to FIGS. 1, 2, 3A and 3B, If the belleville washer 65 is made of a reversible, shape memory of type 2 or 3, metal alloy, it can be installed in the retracted condition as shown in FIG. 3B. Note that the distance between upper edge 50 of the side wall 48 and the underside surface 57 of the center portion 56 are at a distance indicated by numeral 75. The bolt 26 is torqued to the desired level and just prior to the launch of the booster 12, the heating elements 76 and 78 are turned on. This will cause the belleville washer 65 to try to expand such that the distance 75 between the upper edge 50 and under side surface 57 is at a greater distance, indicated by numeral 75. Since it can not, the device 15 exerts an expansion force on the joint as it attempts to expand to the position as illustrated in FIG. 3A.

Upon launch of the booster, the electrical power to the heating elements 76 and 78 are deactivated, causing the belleville washer 65 to return to the configuration shown in FIG. 3B, reducing the preload on the joint over a 10 to 20 minute period. Thus subsequent separation of the booster structure 12 from the satellite structure 10 when the explosive fastener assembly 14 is activated, will not cause excessive shock loads to be introduced into the satellite structure 10.

Still referring to FIGS. 1, 2, 3A and 3B, if the shape memory alloy used in the manufacture of the belleville washer 65 is a type 1 simple one way shape memory metal alloy, then it would be initially installed in the configuration shown in FIG. 3A, that is expanded. The explosive actuated fastener assembly 14 would be torqued to the required preload level so that the satellite structure 10 will withstand the booster structure 12 induced vibrationary loads. After the boost phase, power would be applied to the heating elements 76 and 78 causing the belleville washer 65 to retract to the contracted position shown in FIG. 3B reducing the preload allowing separation without inducing shock loads into the satellite structure 10.

Figure 4:
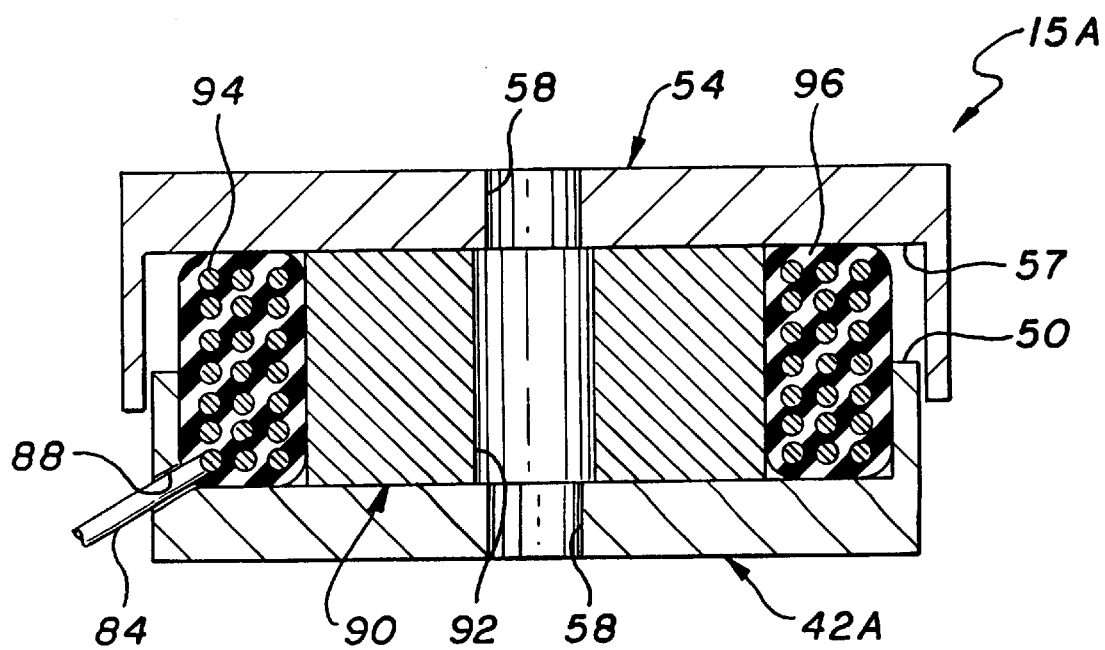
FIG. 4. is a view similar to FIG. 3A illustrating an alternate embodiment of the preload attenuation device.

Referring to FIG. 4, which is a view of a device 15A, similar to the device 15 illustrated in FIG. 3A. Thus similar elements are provided with the same identifying number. In this embodiment, the belleville washer 65 has been replaced with a cylindrical element 90 having a center hole 92 and a single heater element 94, also contained with a Silicon material 96. In addition, the Cup shaped member 42A, similar to cup shaped member 42 has only one hole 88 for a single wire 84, since there is only one heating element. However, two circuits (not shown) can be used to add redundancy. The cylindrical element 90 can also be made with a simple one way or a reversible two way shape memory actuation. It is provided to illustrate that other shapes besides a belleville washer are usable in this invention.

Thus it can be seen that the preload attenuation device can be used for preloading structures and for attenuating the preload. It is a simple design and thus simple to manufacture. In addition, the inclusion of redundant heating elements in the device using a belleville washer as the insert provides redundancy. Finally, the encapsulating of the heating elements in a Silicon compound promotes rapid heating and thus actuation times are reduced.

While the invention has been described with reference to particular embodiments, it should be understood that the embodiments are merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the fastener industry.

What is claimed is:

1. A preload attenuation device comprising:

an inverted first cup shaped member having a center portion with an aperture therethrough and further having a side wall;

a second cup shaped member having a center portion with an aperture therethrough and a side wall, said side wall in slidable engagement with the inner wall of said side wall of said first cup forming a compartment therebetween;

an insert mounted within said compartment made of a shape memory metal alloy having a first and second sides at least partially engaged with said center portions of said first and second cups, respectively; said insert having an aperture therethrough, said shape memory metal alloy selected from the group consisting of a one way shape memory alloys that under go a deformation in a martensitic state that is definitively cancelled out during the passage to a austenitic state, or a trained two way shape memory metal alloys where a deformation undergone in the martensitic state is cancelled out during the passage into the austenitic state, but is reassumed during a subsequent passage to the martensitic state, or a trained two way memory alloy where additional deformation undergone using a bias force during the austenitic to martensitic state is cancelled out during the passage into the austenitic state, but is reassumed during a subsequent passage to the martensitic state minus the additional induced deformation; and a heating element mounted within said compartment; and a flexible compound encapsulating said at least one heating element.

2. The device as set forth in claim 1 comprising said insert in the form of a belleville washer having first and second sides, said first side having an inner surface in contact with said center portion of one of said first or second cups and said second side having an outer edge in contact with said center portion of the other of said first or second cup.

3. The device as set forth in claim 2 wherein there is a heating element on either side of said belleville washer.

4. The device as set forth in claim 1 wherein said insert has a cylindrical shaped cylinder.

5. The device as set forth in claim 4 wherein there is one heating element extending about said cylindrical shaped element.

6. The device as set forth in claim 1, or 2, or 3, or 4, or 5, wherein said flexible compound is flexible Silicon compound.

7. The device as set forth in claim 6 wherein said flexible Silicon compound contains metal or metal oxide filers.

8. A preload attenuation device comprising:

a telescoping housing having first and second ends;

a shape memory insert mounted within said housing in contact with said first and second ends of said housing, said shape memory metal alloy selected from the group consisting of: a one way shape memory alloys that under go a deformation in a martensitic state that is definitively cancelled out during the passage to a austenitic state and trained two way shape memory metal alloys where a deformation undergone in the martensitic state is cancelled out during the passage into the austenitic state, but is reassumed during a subsequent passage to the martensitic state and a trained two way memory alloy where additional deformation undergone using a bias force during the austenitic to martensitic state is cancelled out during the passage into the austenitic state, but is reassumed during a subsequent passage to the martensitic state minus the additional induced deformation;

at least one heating element mounted within said housing in proximity to said insert; and a flexible compound encapsulating said at least one heating element.

9. The device as set forth in claim 8 wherein an aperture extends from said first end, said insert and said second end.

10. The device as set forth in claim 9 wherein said insert is a belleville washer.

11. The device as set forth in claim 10 wherein there is a heating element on either side of said belleville washer.

12. The device as set forth in claim 9 wherein said insert has a cylindrical shaped cylinder.

13. The device as set forth in claim 12 wherein there is one heating element extending about said cylindrical shaped element.

14. The device as set forth in claim 8, or 9, or 10, or 11, or 12, or 13, wherein said flexible compound is flexible Silicon compound.

15. The device as set forth in claim 14 wherein said flexible Silicon compound contains metal or metal oxide filers.

* * * * *